US006120548A

United States Patent [19]
Jarvis et al.

[11] Patent Number: 6,120,548
[45] Date of Patent: Sep. 19, 2000

[54] METHOD AND SYSTEM FOR ESTIMATING PARTICLE MOTION

[75] Inventors: Robert D. Jarvis, Austin; Paul Nelson, Jr., College Station, both of Tex.

[73] Assignee: The Texas A&M University System, College Station, Tex.

[21] Appl. No.: 08/897,728

[22] Filed: Jul. 21, 1997

Related U.S. Application Data

[60] Provisional application No. 60/022,037, Jul. 22, 1996.

[51] Int. Cl.[7] .............................. G06F 7/60; G06F 17/10; G06F 101/00
[52] U.S. Cl. .................................... 703/2; 703/6; 250/251
[58] Field of Search ........................ 395/500.27, 500.28, 395/500.3, 500.23; 703/2, 6, 7, 9; 250/251

[56] References Cited

PUBLICATIONS

"Parallel Multigrid Methods Transport Equations: The Anistropic Case," *Parallel Computing*, (1996) pp. 513–537 by S. Oliveira.

Azmy, "On the Adequacy of Message–Passing Parallel Supercomputers for Solving Neutron Transport Problems", IEEE Proceedings of Supercomputing '90, pp. 693–699, Nov. 1990.

Boehm et al, "Parallel Conjugate Gradient Algorithms for Solving the Neutron Diffusion Equation on SUPRENUM", ACM Proceedings of the 1991 International Conference on Supercomputing, pp. 163–171, 1991.

*Primary Examiner*—Kevin J. Teska
*Assistant Examiner*—Samuel Broda
*Attorney, Agent, or Firm*—Baker Botts L.L.P.

[57] ABSTRACT

A method [40, 70] for estimating particle motion is provided. The method includes a plurality of processing nodes of a parallel processor [12] accessing in parallel data related to an estimate of cell exiting particle fluxes from the immediate upstream cell and fluxes exiting into a group boundary to a current cell of a plurality of cells.

11 Claims, 7 Drawing Sheets

METHOD AND SYSTEM FOR ESTIMATING PARTICLE MOTION

RELATED APPLICATIONS

This application claims the benefit of U.S. Provisional Patent Application No. 60/022,037, "New Parallelization of the Plane-Parallel Discrete ordinates," filed Jul. 22, 1996, commonly owned and assigned with the present application.

TECHNICAL FIELD OF THE INVENTION

This invention relates generally to the field of computer modeling, and more particularly to a method and system for estimating particle motion and density for neutral particles.

BACKGROUND OF THE INVENTION

Particle transport calculations predict the time-dependent spatial density or flux distribution of "freely moving" particles whose motion is influenced only by interaction with other particles and their fields. These calculations have varied applications, such as the design of equipment that controls or utilizes radiation (nuclear reactors, nuclear devices, and medical treatment and diagnostic equipment), the analysis of neutron probe data obtained from geologic exploration, and the modeling of other "particle" systems, such as rarified gases, semiconductors, and vehicular traffic.

One of the main mathematical algorithms used to model the motion of such particles is the transport equation. The transport equation may be solved for complex geometries using numerical methods, in which, for example, the object or system being studied may be modeled as a continuum of discrete cells.

Recent advances in the design and use of multicomputers having parallel processors have allowed calculations for many kinds of models using spatial discretization to be implemented in parallel, which potentially increases the speed at which a solution for these models may be calculated. Nevertheless, the solution of the transport equation has not been optimized for use on a multicomputer parallel processor platform, because the ray tracing sweep used in solving the spatially discretized transport equation has been considered to require strictly serial analysis for the best iteration convergence rates to be achieved.

SUMMARY OF THE INVENTION

Therefore, a need has arisen for an improved method for solving the transport equation that may be implemented on a parallel processor multicomputer platform.

According to the teachings of the present invention, a method and system for estimating particle motion is provided that substantially eliminates or reduces some of the disadvantages associated with prior systems and methods.

A method for estimating particle motion is provided. The method includes a plurality of processing nodes accessing in parallel data related to an estimate of cell exiting particle fluxes from the immediate upstream cell and fluxes exiting into a group boundary to a current cell of a plurality of cells.

The present invention provides many important technical advantages. One important technical advantage of the present invention is a method for estimating particle motion that uses simultaneous calculation of cell edge flux estimate in the ray tracing sweep to achieve a Gauss-Seidel convergence rate in the source iteration for particle flux estimate calculations. The Gauss-Seidel convergence rate is accomplished by updating cell edge particle flux estimates based on current estimates of upstream flux values during the ray-tracing sweep calculations in the source iteration for the transport equation solution.

Another important technical advantage of the present invention is a system for estimating particle motion that uses parallel processors to achieve a Gauss-Seidel convergence rate for particle flux estimate calculations. The Gauss-Seidel convergence rate is accomplished by updating cell edge particle flux estimates based on current estimates of upstream flux values during the ray-tracing sweep calculations in the source iteration for the transport equation solution.

BRIEF DESCRIPTION OF THE DRAWINGS

For a more complete understanding of the present invention and advantages thereof, reference is now made to the following description taken in conjunction with the accompanying drawings, in which like reference numbers indicate like features and wherein.

DETAILED DESCRIPTION OF THE DRAWINGS

Preferred embodiments of the present invention are illustrated in the FIGURES, like numerals being used to refer to like and corresponding parts of various drawings.

Figure 1:
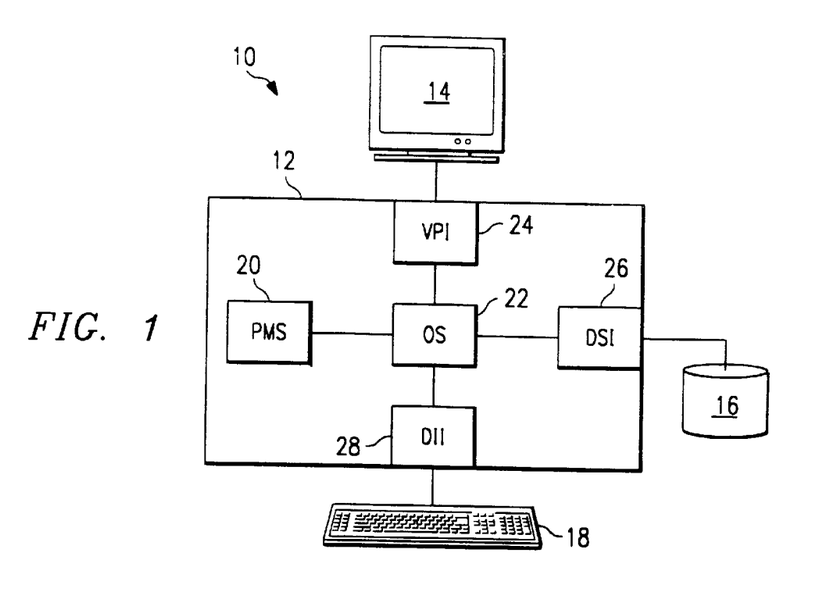
FIG. 1 is a diagram of an exemplary particle motion estimation system for estimating particle motion embodying concepts of the present invention.

FIG. 1 is an exemplary particle motion estimation system 10 for estimating particle motion embodying concepts of the present invention. Particle motion estimation system 10 comprises parallel processor 12, video display 14, data storage device 16, and keyboard 18. Physical data that describe the size, mass, energy, and initial conditions of the particles are input to parallel processor 12 from data storage device 16 and keyboard 18. Software systems operating on parallel processor 12 estimate the motion of the particles in accordance with concepts of the present invention. The estimated motion of particles is then displayed in a visual or graphical format on video display 14, and data describing the estimated motion of particles is stored on data storage device 16.

Parallel processor 12 comprises programmable data processing equipment that may include two or more processors, random access memory (RAM) or other memory or storage devices, and one or more of the following: input/output devices, network interface cards, printer cards, sound cards, CD-Rom drive interface cards, and other typical programmable data processing equipment components. Parallel processor 12 may comprise other suitable data processing equipment that is operable to implement particle motion system (PMS) 20, operating system (OS) 22, video display interface system (VDI) 24, data storage interface system (DSI) 26, and data input interface system (DII) 28.

Parallel processor 12 is an nCube-2S hypercube—connected, homogeneous, asynchronous, message-passing multicomputer configured with 64 processing nodes. Alternatively, parallel processor 12 may be any suitable computing platform that is designed to operate with two or more processors. The two or more processors of parallel processor 12 are designed to operate in parallel, such that calculations may be performed simultaneously on each of the processors. This parallel processor architecture allows certain calculations to be performed more rapidly. For example, calculations involving the addition of a large number of variables may be performed more rapidly with parallel processors than with a single processor operating at the same speed.

The 64 processing nodes of parallel processor 12 may include one head node and 63 standard nodes. The head node of parallel processor 12 may perform all of the functions of the 63 standard nodes, and also coordinates the functioning of the 63 standard nodes. For example, the head node may receive a message from each node as each node finds that iteration termination conditions have been met locally, while all nodes are performing operations in parallel. The head node may then send messages to all nodes that cause the iteration to cease. In addition, data input and output may be coordinated through the head node.

Video display 14 is a video terminal that may be used to create graphical or textual images for a user. Video display 14 may include display devices such as liquid crystal diode displays, printers, or other suitable output devices.

Data storage device 16 comprises a data storage device such as a disk drive, a random access memory, a tape drive, or other suitable storage devices. Data storage device 16 is coupled to data storage interface system 26 and is operable to receive data from and transfer data to data storage interface system 24.

Keyboard 18 comprises a keyboard data input device that is operable to generate data representative of selected keys. Keyboard 18 may alternatively comprise other suitable data input devices, including but not limited to tape drives, disk drives, ethernet interfaces, or mouse devices. Keyboard 18 is coupled to data input interface system 28.

Particle motion system 20 is a software system that receives data on the initial physical state of one or more particles and estimates the motion of those particles. In particular, particle motion system 20 solves the linear, steady-state, monoenergetic, azimuthally symmetric form of the neutral particle transport equation, for plane-parallel geometry. The linear, steady-state, monoenergetic, azimuthally symmetric form of the neutral particle transport equation may be represented as follows:

$$\mu \frac{\partial \psi(x, \mu)}{\partial x} + \sigma(x)\psi(x, \mu) = \int_{-1}^{1} k(x, \mu, \mu')\psi(x, \mu')d\mu' + Q(x, \mu)$$

where
  x=a position in the single spatial dimension;
  $\mu$=cosine of the angle of the direction of travel of a free particle relative to the axis;

$\psi(x, \mu)$=angular flux of the particles at x (number of particles crossing a differential unit of area in a differential unit of time, moving in direction $\mu$)

$\sigma(x)$=total cross section at x (probability of interaction of any kind with a member of the medium per unit of path length traversed)

$k(x,\mu,\mu')$=differential scattering cross section at x (probability that a collision at x involving a free particle moving in direction $\mu'$ will result in a particle moving in direction $\mu$)

$Q(x,\mu)$=angular flux of particles at x traveling in direction $\mu$ generated by an independent source.

The following boundary conditions apply for this equation:

$$\psi(0,\mu)=\psi_0(\mu) \text{ for } 0<\mu\leq 1 \text{ and } \psi(a,\mu)=\psi_a(\mu) \text{ for } -1\leq\mu<0$$

The transport equation may be solved using a closed linear one-cell functional (CLOF) spatial approximation method. Closed linear one-cell functional methods comprise a large class of finite element or finite difference spatial discretization methods. In a closed linear one-cell functional method, the particle flux and other variables are modeled and solved for a continuum of discrete spatial cells.

The approximation to the total source $q_{ij}$ along the I-th direction and in the j-th cell is conceptually defined as a basic linear functional (BLF), where the basic linear functional represent each of the equations $L_{mij}$ ($q_{ij}$), m=1, ..., M. These basic linear functional may be interpreted as generalized moments of the total source across the cell.

The updating in one iterative cycle of the corresponding inner source iteration can be considered as beginning with values of the source functional at the end of the preceding cycle, denoted by $L_{mij}^{*(n)}$ ($q_{ij}$), where the parenthetical superscript n is an iteration index and the asterisk indicates that the value is approximated. If $\psi_{ij}$ denotes the angular flux at the right edge of the j-th cell in the direction of $\mu$, for $\mu_i$ greater than 0 the updating of the cell-edge fluxes in the next iterative cycle is done as:

$$\psi_{ij}^{*(n+1)} = \tau_{ij}^* \psi_{ij-1}^{*(n+1)} + \sum_{m=1}^{M} b_{mij} L_{mij}^{*(n)} q_{ij}$$

The basic linear functional of the fluxes are updated in accordance with:

$$L_{mij}^{*(n+1)}\left(\psi_{ij-1}^{*(n+1)}\right) = \tau_{mij}^* \psi_{ij-1}^{*(n+1)} + \sum_{m'=1}^{M} b_{m'mij} L_{m'ij}^{*(n)}(q_{ij})$$

The iterative cycle is closed by updating the basic linear functional of the sources in accordance with the following equation:

$$L_{mij}^{*(n+1)}(q_{ij}) = L_{mij}(Q_{ij}) + \sum_{i'=1}^{N} \omega_{i'} \left[ k_j(\mu_i, \mu_{i'}) L_{mij}^{*(n+1)}\left(\psi_{ij}^{*(n+1)}(\mu_{i'})\right) + k_j(\mu_i, -\mu_{i'}) L_{mij}^{*(n+1)}\left(\psi_{ij}^{*(n+1)}(-\mu_{1'})\right) \right]$$

A similar process is followed in also updating these quantities moving from right to left. The $\mu_i$ are the positive quadrature points. The number of quadrature points may be increased to increase the accuracy of the calculation, or may be decreased to decrease the computing time for the solution.

The cell-edge flux update of the closed linear one-cell functional equations, which has the following form:

$$\psi_{ij}^{*(n+1)} = \tau_{ij}^* \psi_{ij-}^{*(n+1)} + \beta_{ij}^{*(n)}$$

may be solved as a prefix problem. A prefix problem may be defined as follows:

Given any set A that is closed under any defined associative binary operation "*" and $x_i \in A$, i=1, ..., N, find all $a_i$ such that $a_i = x_1 * x_2 * \ldots * x_i$.

Setting up the flux update of the ray-tracing sweep for a closed linear one cell functional method as a prefix problem allows the transport equation to be solved using parallel processors and a Gauss-Seidel iterative method, which prevents degradation of the speed of convergence for the iteration used to solve the transport equation from that typically achieved on uniprocessor systems. By representing $\psi_j$ as the vector $\psi_j = (\psi_j, 1)$ and setting up the recurrence coefficients in a matrix $T_j$ defined as follows:

$$T_j = \begin{bmatrix} \tau_j & 0 \\ \beta_j & 1 \end{bmatrix}$$

the cell-edge flux update of the ray-tracing sweep may be restated in the form:

$$\psi_j = \psi_0 * T_1 * T_2 * \ldots * T_j$$

This solution of the ray-tracing sweep may be implemented in parallel, and may thus be formulated for use on parallel processors, using one or more cells on each processor. If more than one cell is associated with each processor, it is also necessary to perform serial cell update calculations, but these serial cell update calculations are performed in parallel on each processor.

Solving the ray-tracing sweep using this form allows the update of each cell-edge flux during the sweep to be based on the result of the update from the preceding cell in the same sweep. This solution may be used to implement a blockwise Gauss-Seidel iteration, with the result that the solution to the transport equation converges in fewer iterations than for methods that use the previous sweep updates for the current sweep, such as a blockwise Jacobi type of iteration.

Particle motion system 20 is implemented with a hypercube multiprocessor architecture, but may also be implemented with other suitable parallel processor architectures, such as tree-type architectures, mesh-type architectures, or other suitable parallel processing architectures. Each processor of the parallel processor is a single computational/communication node that may process one or more cells, depending upon the number of cells and the number of processors. If each processor node handles more than one cell, the cells in the group on each processor must be processed serially, but the groups of cells are processed in parallel.

In general, a parallel processor architecture having a communications diameter of $\log_2(n)$, in which the maximum number of steps of separation between any two nodes does not exceed the base 2 logarithm of the total number of nodes, n, provides the optimal speed of convergence for particle motion system 20. In this context, a node is a computation/communication node, and each node may be associated with one or more processors. Nevertheless, particle motion system 20 may be implemented with parallel processor architectures having communication diameters of greater or less than $\log_2(n)$. Particle motion system 20 is a prefix problem calculation device.

Operating system 22 comprises a parallel processor operating system that performs general parallel processor operating functions, such as memory management, file management, and the transmission of data between parallel processors, systems and peripheral devices. Operating system 18 is a commercially-available operating system, but may alternatively comprise an optimized operating system for use with particle motion system 20.

Video display interface system 24 comprises circuitry and software that are operable to transfer data to any output device such as a video display 14. Video display interface system 24 is coupled to operating system 22 and video display 14. Video display interface system 24 may comprise one or more software applications, data buses, data storage and output devices, and other suitable components.

Data storage interface system 26 comprises circuitry and software that are operable to transfer data between an external data storage device and operating system 22. Data storage interface system 26 is coupled to operating system 22 and to data storage device 16. Data storage interface system 26 is operable to retrieve data stored on data storage device 16, to change the data into a format that is compatible with operating system 22, and to transmit the data to operating system 22.

Data input interface system 28 comprises circuitry and software that are operable to transfer data between an external input device and operating system 18. Data input interface system 28 is coupled to operating system 22 and to keyboard 18. Data input interface system 28 is operable to receive data generated by or transmitted from keyboard 18, to change the data into a format that is compatible with operating system 22, and to transmit the data to operating system 22.

In operation, particle motion estimation system 10 is used to estimate the motion of particles based on known initial physical conditions and known characteristics of the particles and the medium in which they are moving. Particle motion estimation system 10 uses parallel processors to increase the speed at which particle motion system 20 will converge to an acceptable estimate of particle motion estimate. Particle motion system 20 uses a closed linear one-cell functional formulation of the ray-tracing sweep for the transport equation that has been reduced to a parallel prefix problem format, thus allowing the solution of the ray-tracing sweep of the transport equation to be implemented with parallel processors while achieving Gauss-Seidel convergence rates for the iteration.

Figure 2:
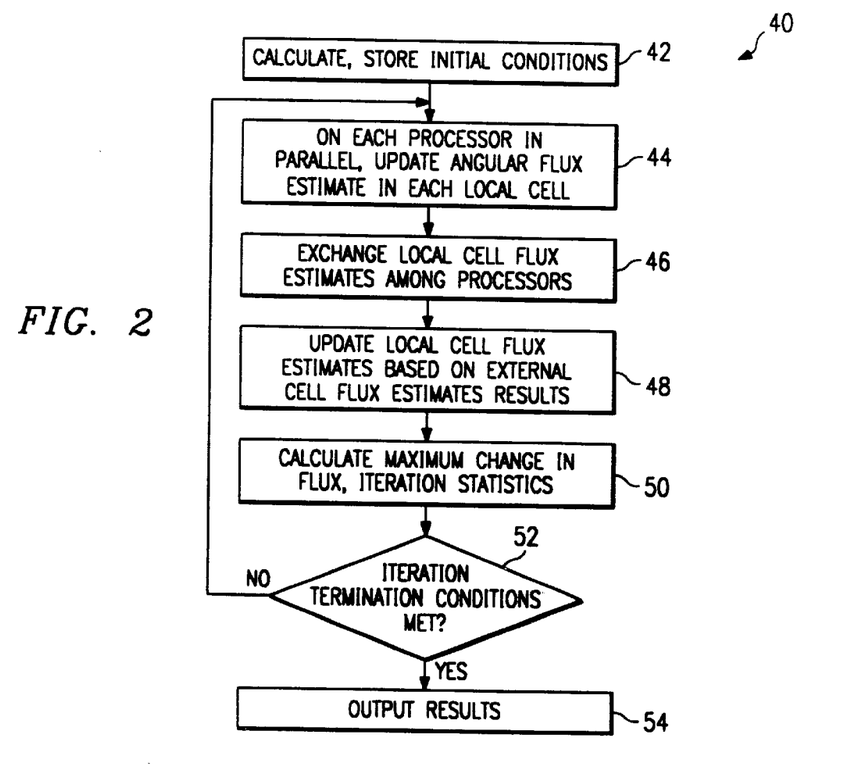
FIG. 2 is a flow chart of an iterative method for estimating particle motion embodying concepts of the present invention.

FIG. 2 is a flow chart of a method 40 for predicting particle motion embodying concepts of the present invention. Method 40 begins at step 42, where data representative of the initial conditions for the transport equation are input to each of the processors of a multicomputer computing platform having parallel processors. These initial conditions may be stored in a physically separate data storage memory device associated with each processor, or may be stored in a data storage memory device internal to each processor. Each processor may calculate additional initial conditions from the entered data.

At step 44, the angular flux for each local cell is calculated using the known physical relationship between cells. These calculations are performed on each processor in parallel, and for each cell in series when more than one cell is associated with a processor. The local cell flux estimates are then exchanged between the parallel processors at step 46, such that each processor has the incoming cell flux estimate to the local group of cells from the immediate upstream group of cells. The angular flux for all processor local cell is then updated simultaneously at each processor node with all processors operating in parallel at step 48 using the external cell fluxes received at step 46.

After the updated angular flux has been calculated at all nodes for each cell, the maximum change in flux and other iteration statistics are calculated at step 50. At step 52, it is determined whether iteration termination conditions have been met. For example, if the maximum change in flux is less than a predetermined value, then it may be assumed that the iteration has converged. If iteration termination conditions have been met, the method proceeds to step 54 and the results are generated in a predetermined output format. If the iteration termination conditions have not been met, the method returns to step 44 and another iteration is performed.

Method 40 is implemented with a hypercube parallel processing architecture, which has a $\log_2(n)$ communication diameter. As previously discussed, the use of an architecture having a $\log_2(n)$ communication diameter provides an optimal sweep time. Alternatively, method 40 may be implemented with many suitable parallel processing architectures, including architectures that do not have a $\log_2(n)$ communication diameter.

Figure 3A:
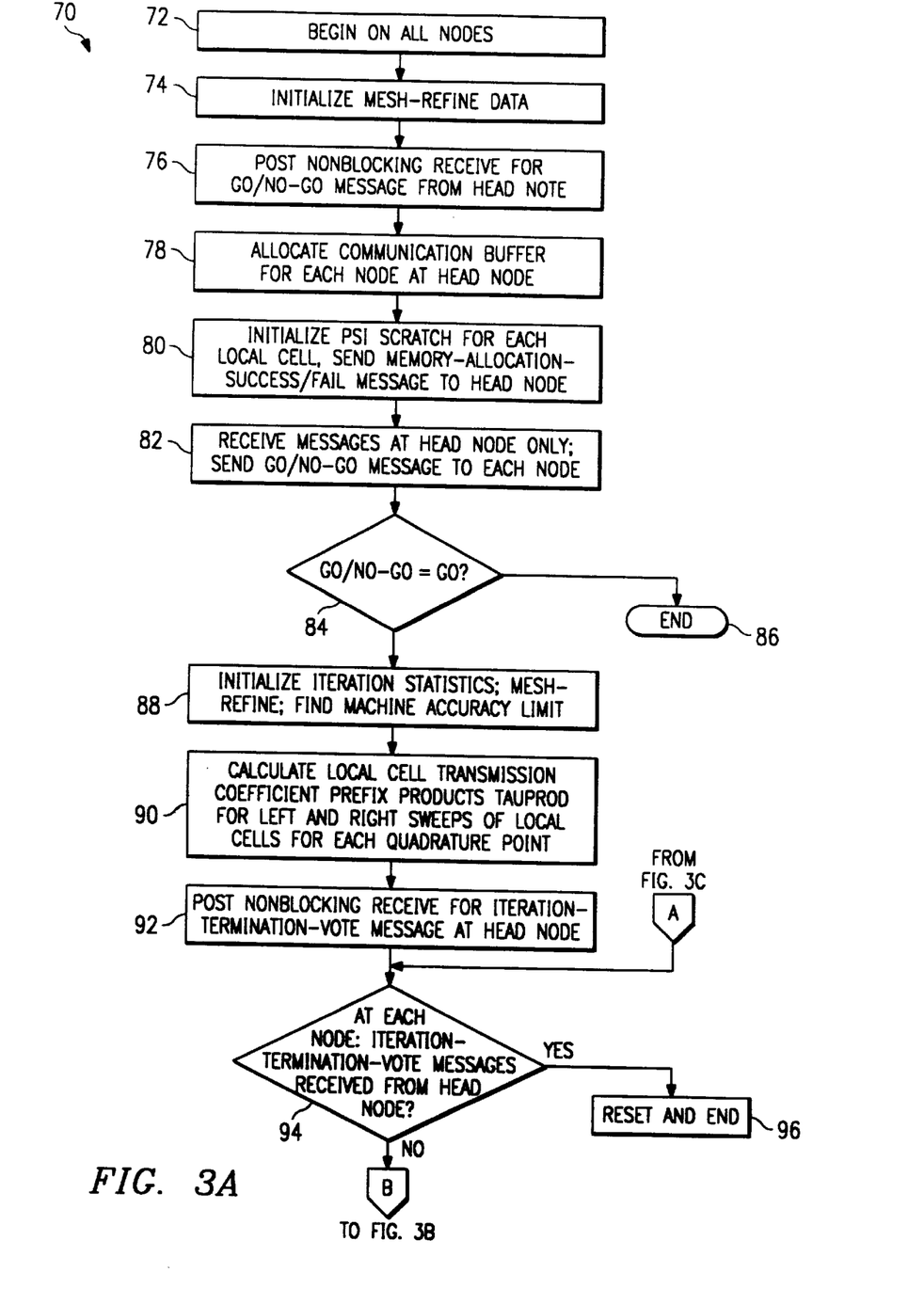
FIGS. 3A, 3B, and 3C are a flow chart of an iteration control method for estimating particle motion embodying concepts of the present invention.
Figure 3B:
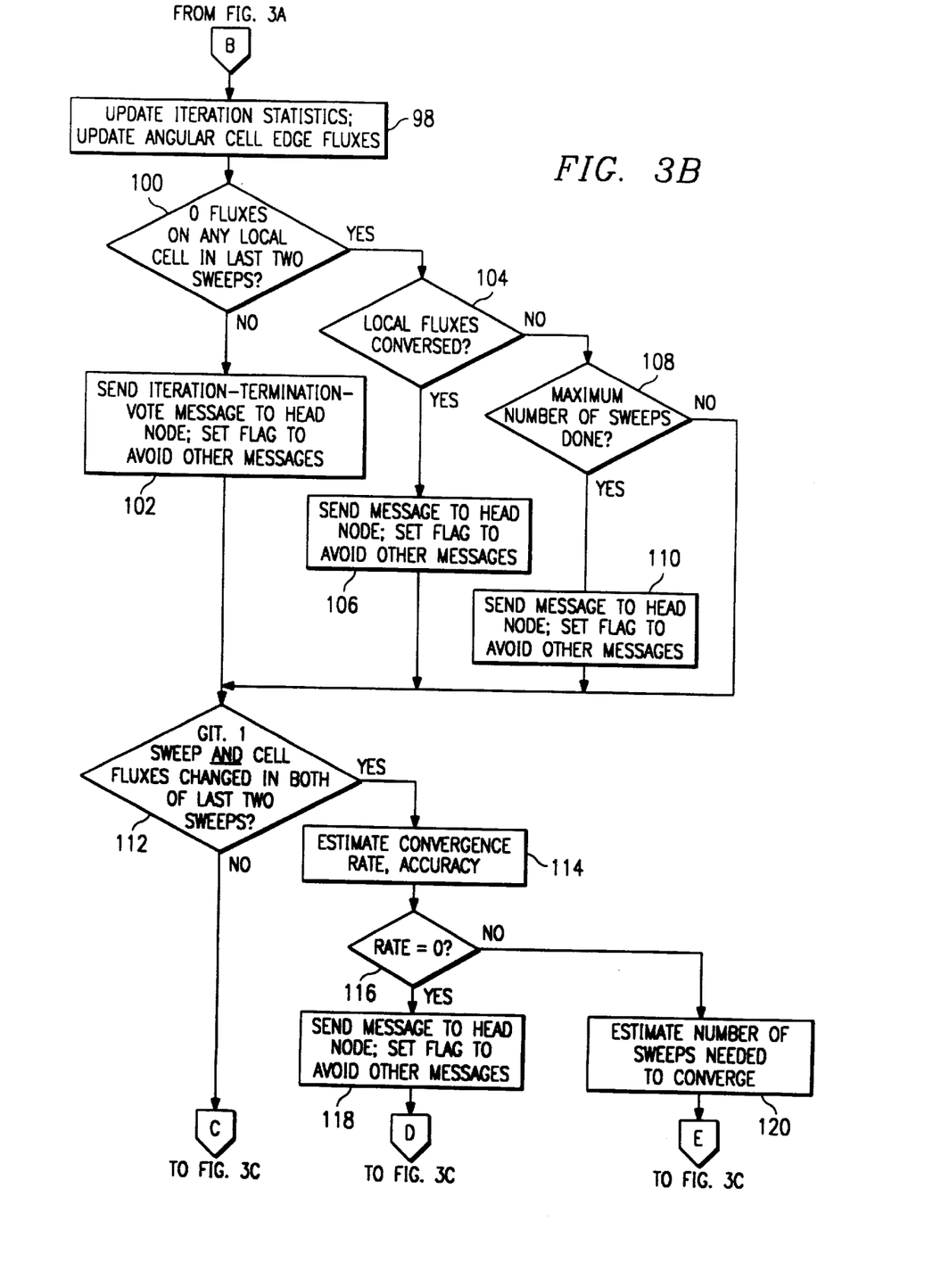
Figure 3C:
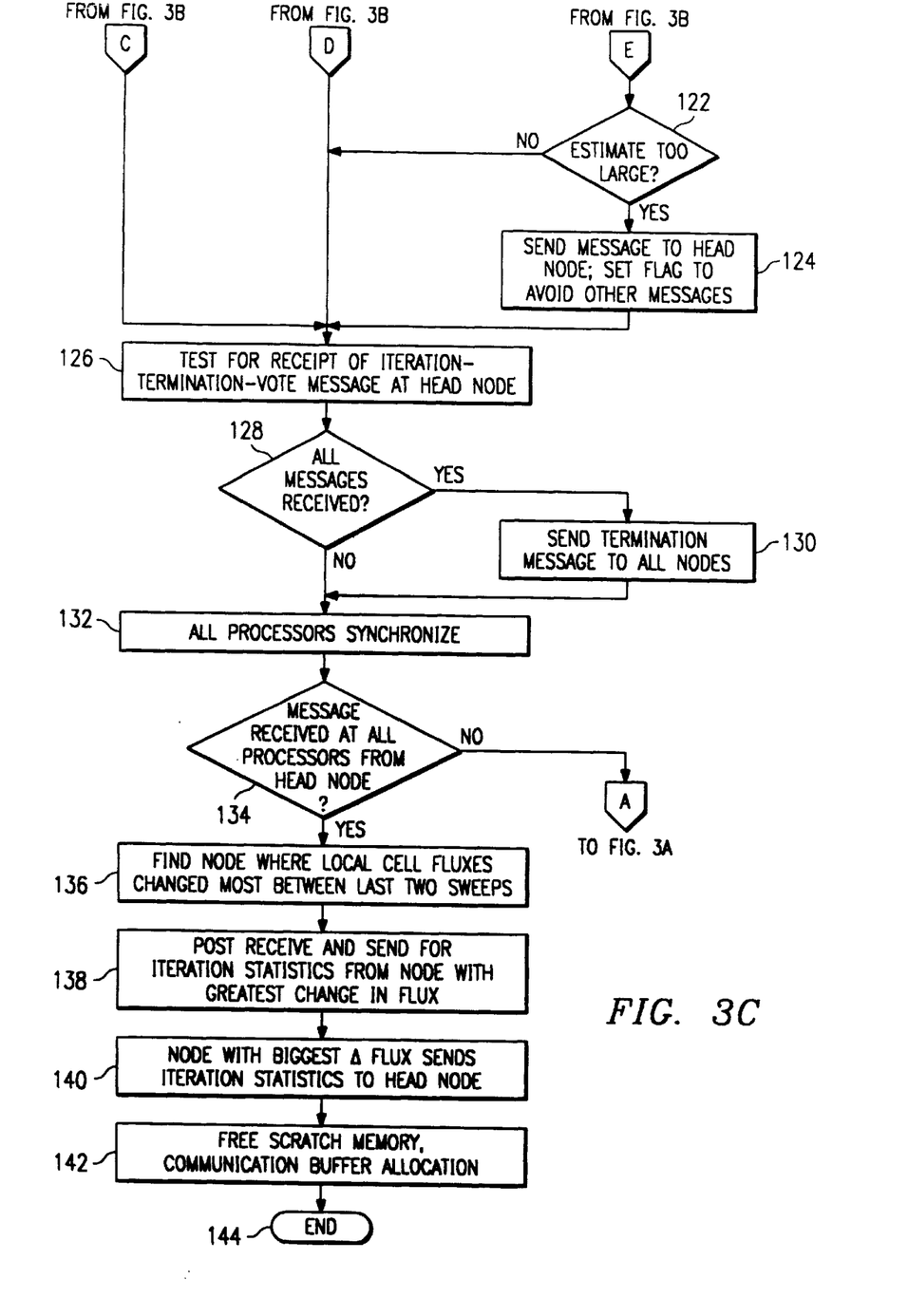

FIG. 3 is a flow chart of a method 70 for estimating particle motion embodying concepts of the present invention. Method 70 may be used on a multicomputer platform having a hypercube parallel processing architecture. Method 70 begins at step 72, where method 70 is initiated on all nodes, such as by loading data and allocating data buffers. At step 74, the iteration statistics (MESH-REFINE) data are initialized. The MESH-REFINE data include output statistics on the source iteration for a given mesh refinement, including the number of sweeps, the number of accelerations, and the convergence rate estimate. The method then proceeds to step 76, where a non-blocking receive is posted at each processor for GO/NO-GO messages from the head node.

At step 78, a communication buffer is allocated for each node at the head node. The method then proceeds to step 80 where the vector PSISCRATCH is initialized for each local cell. PSISCRATCH is a vector that contains the incoming cell edge angular flux estimate for each local cell for use in a later calculation in the same sweep. In addition, a memory allocation success/fail message is sent to the head node from each node at step 80. The method then proceeds to step 82, where the memory allocation success/fail message is received from each node at the head node. The head node sends a GO/NO-GO message to each node when the memory allocation success/fail message is received.

At step 84, it is determined at each node whether a GO/NO-GO message equal to Go has been received at each node. If the GO/NO-GO message does not equal GO, the method proceeds to step 86 and terminates. otherwise, the method proceeds to step 88. At step 88, additional iteration statistics are initialized, and the accuracy limit for the computing platform being used is determined. The method then proceeds to step 90, where the local cell transmission coefficient prefix products (TAUPROD) for the left and right sweeps of the local cells are calculated for each quadrature point and stored for use in the sweeps of the iteration.

At step 92, a non-blocking receive for any ITERATION-TERMINATION-VOTE messages that may be received from each node is posted at the head node. The method then proceeds to step 94 where it is determined at each node whether an ITERATION-TERMINATION-VOTE message has been received from the head node. If an ITERATION-TERMINATION-VOTE message has been received from the head node, the method proceeds to step 96 and terminates after releasing temporary memory allocations. Otherwise, the method proceeds to step 98.

At step 98, the iteration statistics are updated, and the angular cell edge flux estimates are updated by a suitable method. After the angular cell edge flux estimates have been calculated, the method proceeds to step 100. At step 100 it is determined whether a change in the cell edge flux estimate for any local cell has occurred in the last two steps. If a change has not occurred, the method proceeds to step 102. At step 102, an ITERATION-TERMINATION-VOTE message is transmitted to the head node. In addition, a flag is set to avoid sending other ITERATION-TERMINATION-VOTE messages.

If a change in edge flux estimate on any other local cell has occurred during the last two sweeps at step 100, the method proceeds to step 104. At step 104, it is determined whether the local cell edge flux densities have converged. If the local cell edge flux densities have converged, the method proceeds to step 106 where an ITERATION-TERMINATION-VOTE message is sent to the head node. In addition, a flag is set to avoid sending other ITERATION-TERMINATION-VOTE messages.

If the local edge flux densities have not converged at step 104, the method proceeds to step 108. At step 108, it is determined whether the maximum number of sweeps has been performed. If the maximum number of sweeps has been performed, an ITERATION-TERMINATION-VOTE message is sent to the head node. In addition, a flag is set to prevent subsequent ITERATION-TERMINATION-VOTE messages from being generated. The method then proceeds to step 112. If the maximum number of sweeps has not been performed at step 108, the method proceeds directly to step 112.

At step 112, it is determined whether the number of sweeps is greater than one and whether the cell edge flux densities have changed in both of the last two sweeps. If both of these conditions have not been satisfied, the method proceeds to step 126. Otherwise, the method proceeds to step 114.

At step 114, the convergence rate and convergence rate accuracy are estimated. The method then proceeds to step 116 where it is determined whether the estimated convergence rate is equal to zero. If the estimated convergence rate is equal to zero, the method proceeds to step 118 where an ITERATION-TERMINATION-VOTE message is transmitted to the head node. In addition, a flag is set to avoid sending subsequent ITERATION-TERMINATION-VOTE messages. The method proceeds to step 126.

If the estimated convergence rate is not equal to zero at step 116, the method proceeds to step 120. At step 120, the estimated number of sweeps required to converge is determined. The method then proceeds to step 122, where it is determined whether the estimated number of sweeps is greater than a predetermined value. If the estimated number of sweeps is not greater than the predetermined value, the method proceeds to step 124. If the estimated number of sweeps is too large, the method proceeds to step 124, where an ITERATION-TERMINATION-VOTE message is transmitted to the head node. In addition, a flag is set to prevent other ITERATION-TERMINATION-VOTE messages from being sent by this node to the head node. The method proceeds to step 126.

At step 126, data buffers at the head node are tested to determine whether an ITERATION-TERMINATION-VOTE message has been received from every node at the head node. Otherwise, the method proceeds to 132, but if it is determined that an ITERATION-TERMINATION-VOTE message has been received at the head node from every node at step 128, the method then proceeds to step 130. At step 130, the head node sends an ITERATION-TERMINATION message to each node. The method then proceeds from step 130 to step 132.

At step 132, all processors are synchronized. At step 134, it is determined at each processor whether an ITERATION-TERMINATION message has been received from the head node. If an ITERATION-TERMINATION message has been received, the method proceeds to step 136. Otherwise, the method returns to step 94, and another sweep is performed.

At step 136, the node where the local cell edge flux intensity has changed the most between the last two sweeps is determined. The method then proceeds to step 138, where iteration statistics are requested by the head node from the node with the greatest change in cell edge flux estimate. At step 140, the node with the greatest change in cell edge flux estimate transmits the iteration statistics to the head node. The method then proceeds to step 142 where the scratch memory and common buffer allocation is freed. The method then terminates at step 144.

In operation, method 70 causes the ray tracing sweep to be repeated until specified conditions are met. For example, the flux estimates may converge, the estimates may fail to converge or diverge, or the number of sweeps allowed may be reached.

Figure 4:
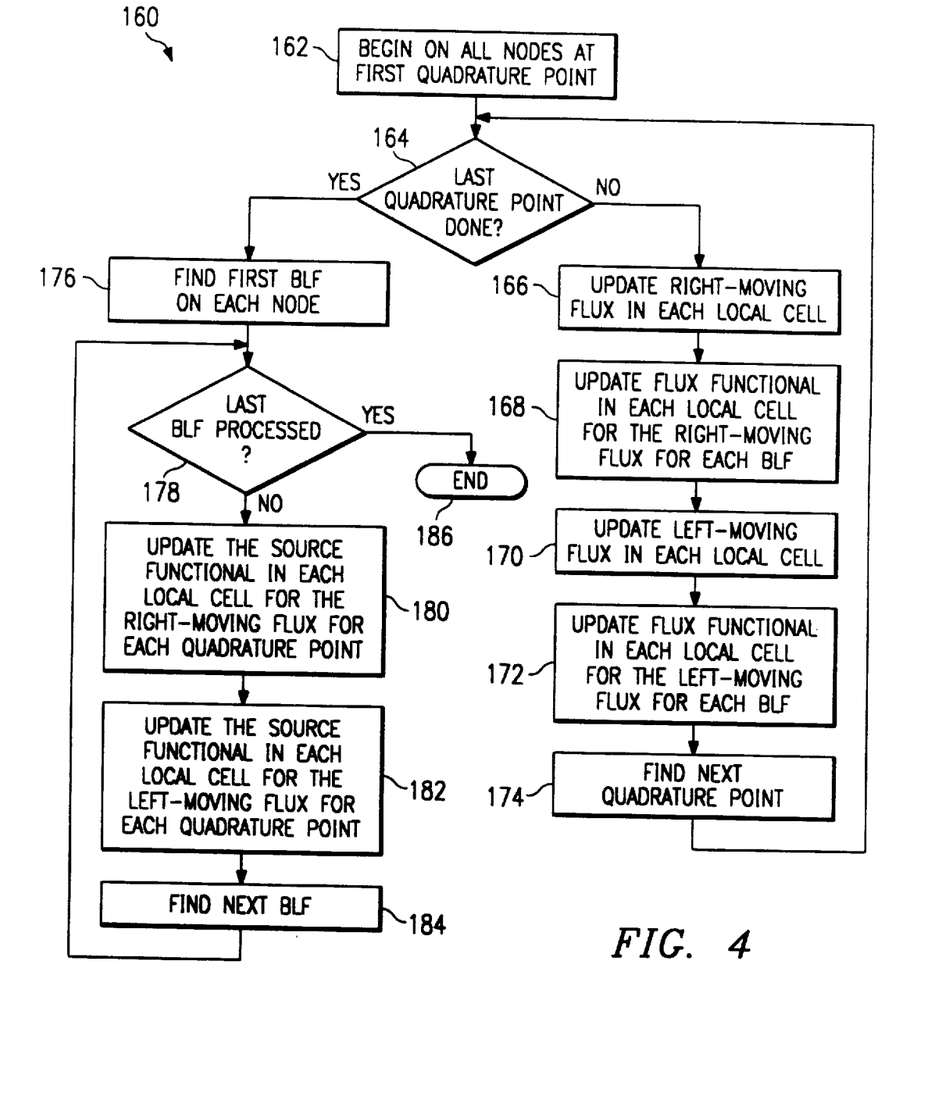
FIG. 4 is a flowchart of a method for updating cell edge fluxes, flux functional, and source functional in each sweep of the iteration for use with a method for estimating particle motion.

FIG. 4 is a flowchart of a method 160 for updating cell edge flux, flux functional, and source functional for use with a method for estimating particle motion. Method 160 may be used in conjunction with method 70 of FIG. 3. For example, method 160 may be used at step 98 of method 70 of FIG. 3 to update the angular cell edge fluxes.

Method 160 is initiated on all nodes for the first quadrature point at step 162, and proceeds to step 164. At step 164, it is determined whether the last quadrature point has been processed. If the last quadrature point has not been processed, the method proceeds to step 166, where the right-moving cell fluxes are updated in each local cell. The method then proceeds to step 168, where the flux functional for each cell for the right-moving flux are updated for each basic linear functional. The method then proceeds to step 170.

At step 170, the left-moving flux in each local cell is updated. The method then proceeds to step 172, where the flux functional for each cell for the left-moving flux are updated for each basic linear functional. The method then proceeds to step 174. At step 174, the next quadrature point is then determined, and the method returns to step 164.

If the last quadrature point is determined to have been processed at step 164, the method proceeds to step 176, where the first basic linear functional is determined at each node. At step 178, it is determined whether the last basic linear functional has been processed. If the last basic linear functional has not been processed, the method proceeds to step 180, where the source functional in each local cell for the right-moving flux for each quadrature point are updated. Next, the source functional in each local cell for the left-moving flux for each quadrature point are updated at step 182. The method then proceeds to step 184, where the next basic linear functional for each node is determined. The method then returns to step 178. If the last basic linear functional is determined to have been processed at step 178, the method terminates at step 186.

Figure 5:
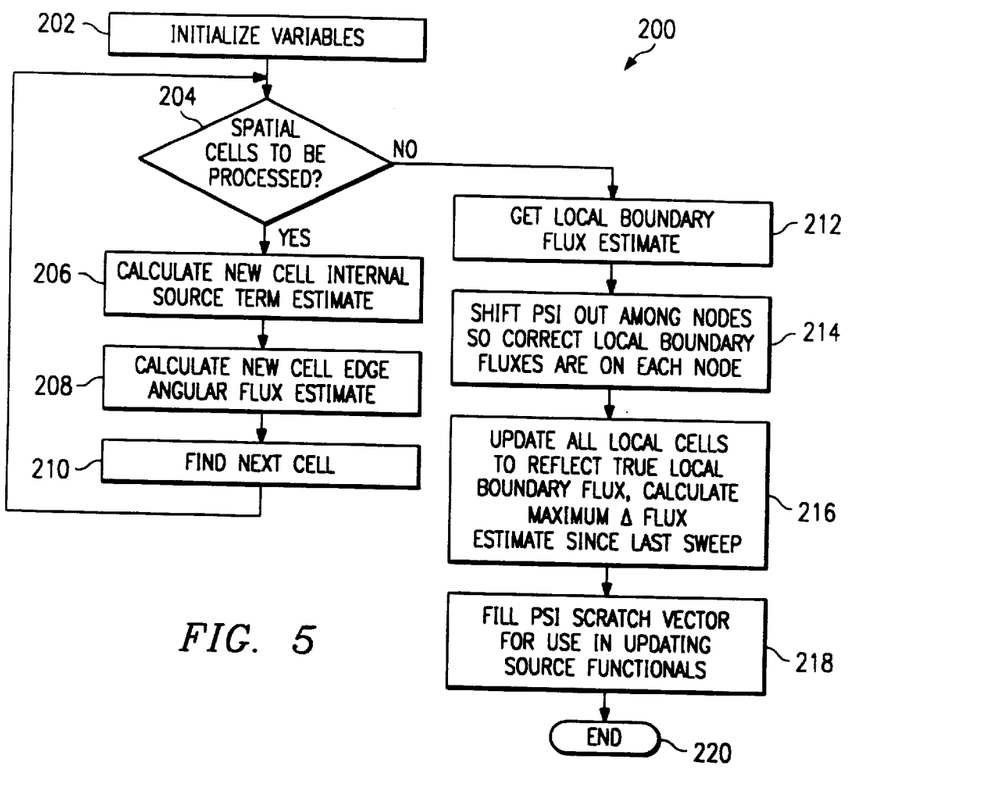
FIG. 5 is a flowchart of a method for updating the cell edge flux estimates for all cells in parallel for use with a method for estimating particle motion.

In operation, method 200 of FIG. 5 initially loops through cells to update the flux estimates. Boundary flux estimates are then exchanged and updated. The flux estimates are then shifted to move the exiting fluxes to the group they are entering. A final loop through the cells updates the estimates based on the boundary flux updates.

FIG. 5 is a flowchart of a method 200 for updating the cell edge flux estimates for all cells in parallel for use with a method for estimating particle motion. Method 200 may be used at steps 166 and 170 of method 160 of FIG. 4 to update cell edge fluxes.

Method 200 begins at step 202, where required variables are initialized. The method then proceeds to step 204, where it is determined whether there are spatial cells to be processed. If there are spatial cells to be processed, the method proceeds to step 206, where the new cell internal source term is calculated. The method then proceeds to step 208, where the new cell edge angular flux estimates are calculated. At step 210, the next cell for each node is determined, and the method returns to step 204.

When it is determined at each node that the last local spatial cell has been processed at step 204, the method proceeds to step 212 for that node. At step 212, the local boundary flux estimates are exchanged and updated among nodes. The method then proceeds to step 214, where each node sends the local cell group's exiting flux estimate to its down-stream neighbor and receives its local cell group's incoming flux estimate from its upstream neighbor. At step 216, the local cell edge flux estimates for each cell are updated to reflect the local boundary flux estimates obtained at step 214. The maximum change in flux since the last ray-tracing sweep is also calculated for all cells at each node. The method then proceeds to step 218.

At step 218, a vector containing the incoming angular flux estimates for each local cell is generated, to be used in updating the flux functionals, such as at steps 168 and 172 of method 160 of FIG. 4. The method then terminates at step 220.

Figure 6:
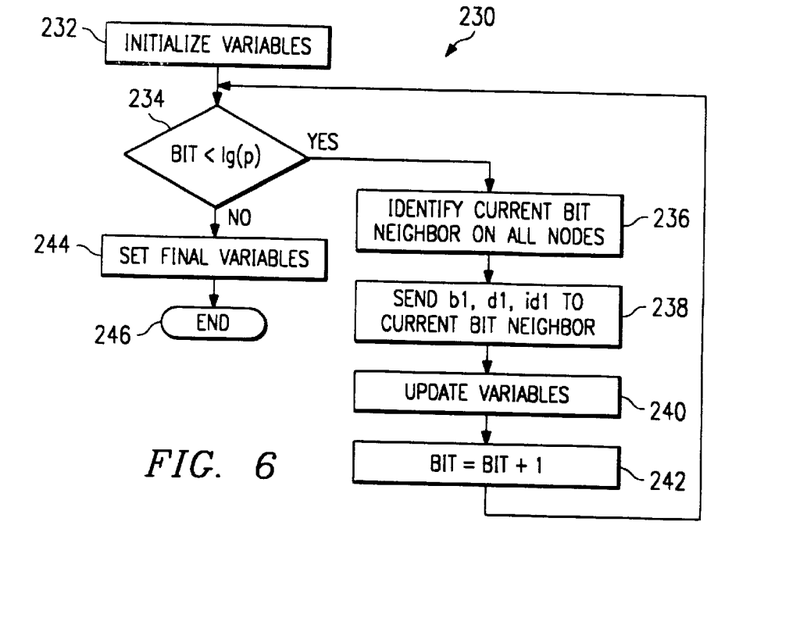
FIG. 6 is a flowchart of a method for exchanging local boundary fluxes among processing nodes for use with a method for estimating particle motion.

FIG. 6 is a flowchart of a method 230 for correcting local boundary fluxes on each processor for use with a method for estimating particle motion. Method 230 may be used to exchange and update exiting cell group boundary flux estimates between nodes, such as at step 212 of method 200 of FIG. 5. Method 230 begins at step 232, where required variables are initialized.

At step 234, it is determined whether the present bit value is less than the base two logarithm of the number of nodes "p." If the present bit number is less than the base two logarithm of the number of nodes, the method proceeds to step 236.

At step 236, the current bit neighbor is identified on all nodes. The method then proceeds to step 238, where accumulator values are sent to the current bit neighbor. These accumulators contain data that defines the boundary flux estimates on each group of cells, such as the values of the flux exiting the most downstream cell assigned to a predetermined subcube (group) that stems from source particles arising in all cells assigned to that subcube of the hypercube, the particle transmission factor across all cells, and other suitable data. The method then proceeds to step 240.

At step 240, the accumulator variables are updated. These variables include data that define the exiting boundary flux estimates for each group and the transmission factor from the most upstream cell through the next downstream cell in the subcube (group). The method then proceeds to step 242, where the present bit is incremented by one. The method then returns to step 234.

If the present bit value is determined to be not less than the base two logarithm of the number of nodes at step 234, the method proceeds to step 244, where the final values of the variables that are used to define the local group boundary flux estimates are stored. The method then terminates at step 246.

Figure 7:
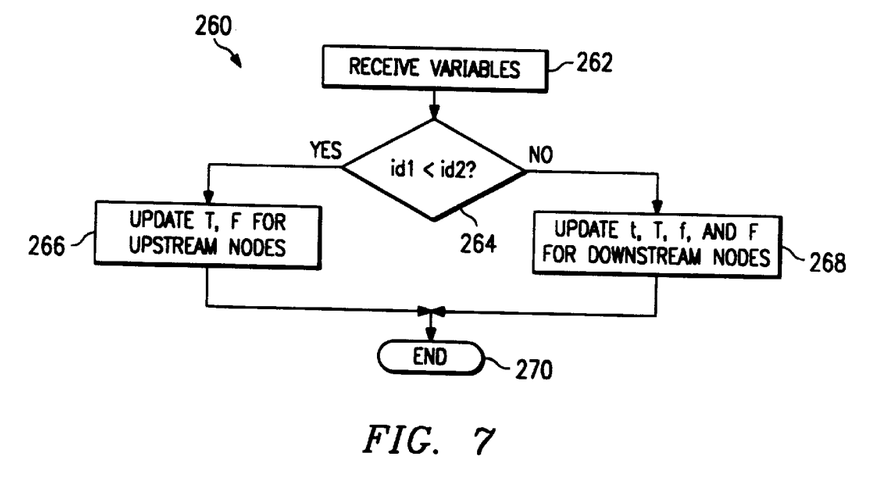
FIG. 7 is a flowchart of a method for updating cell flux and transmission factor estimates for use with a method for estimating particle motion.

FIG. 7 is a flowchart of a method 260 for updating cell flux and transmission factor estimates for use with a method for estimating particle motion. Method 260 may be used at step 240 of method 230 of FIG. 6. Method 260 begins at step 262, where variables that are used to define the local boundary fluxes on each cell are received. The method then proceeds to step 264, where it is determined whether the method is being used for an upstream node or a downstream node.

If an upstream node is being processed the method proceeds to step 266, where the flux exiting the most downstream cell of the combined subcube from source particles arising in all cells of the subcube and the transmission factor across all cells of the combined subcube (group) are calculated. The method then terminates at step 270.

If a downstream node is being processed the method proceeds to step 268, where the flux exiting the most downstream cell of the subcube from source particles arising in all cells of the combined subcube and the transmission factor across all cells in the combined subcube are calculated. In addition, the flux exiting the subcube arising from within the uncombined subcube and the transmission factor from the most upstream cell through the last cell in the subcube are also calculated. The method then terminates at step 270.

In operation, a structure is modeled by dividing the structure spatially into a predetermined number of cells. A closed linear one-cell functional relationship describing the motion of particles through that structure is then formulated in accordance with the transport equation. Initial cell edge flux estimates are then assigned to each cell, and a node comprising a range of cells is assigned to each of a plurality of processors in a parallel processor multicomputer.

The cell edge flux estimates are then updated for each node in accordance with the ray-tracing sweep equation by solving the ray-tracing sweep as a prefix problem. This update may be iteratively repeated until convergence.

The prefix method, as shown in exemplary method 230 of FIG. 6, for the ray trace sweep, as shown in exemplary method 160 of FIG. 4, includes a plurality of processors in parallel, each identifying another processing node that meets the following three criteria. First, each processing node has information that is related to the current estimate of the exiting boundary flux for a set of cells that comprise a contiguous spatial ordering of cells. Second, each processing node is contiguous to the set of cells for which it has information related to the exiting boundary flux. Third, each processing node increases the number of contiguous cells in the set for which the processing node has the information required if such information is exchanged.

The method further includes a plurality of processors in parallel exchanging information relating to the exiting boundary flux for the current full sets of cells represented in the exchange. The method also includes a plurality of processing nodes in parallel, each processing node updating its information relating to exiting boundary fluxes to reflect its own group and the full sets of all the cells in the two sets of cells represented in the exchange.

The methods described above also include a plurality of processing nodes in parallel expanding the scope of the sets of contiguous cells represented from all its previous mate-exchange-update sequences. Each repetition includes the scope represented by its latest mate-exchange-update sequence.

The methods described above further include a plurality of processing nodes accessing in parallel data related to an estimate of cell exiting particle fluxes from the immediate upstream cell and fluxes exiting into a group boundary to a current cell of a plurality of cells. The plurality of processing nodes also determines in parallel for the current cell of a plurality of cells a new estimate of exiting particle fluxes for the cell using the data related to an estimate of cell exiting particle fluxes from the immediate upstream cell.

The steps of accessing in parallel and determining in parallel for the current cell are then repeated until new cell exiting particle flux estimates have been determined for every cell. The plurality of processing nodes further exchange and update in parallel data related to the exiting group boundary flux estimates. The plurality of processing nodes then update in parallel the cell exiting particle flux estimates for the plurality of cells using the updated exiting boundary flux estimates from a upstream plurality of cells. These steps are then repeated until the calculated fluxes converge on stable values.

The present invention provides many important technical advantages. One important technical advantage of the present invention is a method for estimating particle motion that uses simultaneous calculation of cell edge flux estimate in a way that achieves a Gauss-Seidel convergence rate for the source iteration of particle flux calculations. Another important technical advantage of the present invention is a system for estimating particle motion that achieves a Gauss-Seidel convergence rate on this source iteration for particle flux estimate calculations using parallel processors.

Although the present invention has been described in detail, it should be understood the various changes, substitutions, and alterations can be made hereto without departing from the spirit and scope of the invention as defined by the appended claims.

What is claimed is:

1. A method for estimating particle motion in a structure comprising:

modeling the structure spatially into a predetermined number of cells;

formulating a functional relationship that describes the particle motion through the structure;

assigning a node representing a cell group to each of a plurality of processors in a parallel processor multicomputer;

calculating a cell edge flux, flux functional, and source functional for each cell, wherein calculating the cell edge flux comprises:

calculating a new cell internal source term for each cell;

calculating a new cell edge angular flux estimate for each cell; and updating a local boundary flux estimate among nodes, wherein updating the local boundary flux estimate among nodes comprises using a parallel prefix method; and calculating the particle motion estimate.

2. The method of claim 1 wherein the parallel prefix method comprises:

determining a cell-exiting flux estimate for the cell group represented by each node;

exchanging in parallel the cell-exiting flux estimates between nodes that have cell groups adjacent to one another;

updating in parallel the cell-exiting flux estimates for each cell group represented by each node using the cell-exiting flux estimates received from the exchange, wherein each node that participated in the exchange then has data related to the cell-exiting flux estimates of each cell group represented in the exchange, and wherein the cell groups represented in the exchange become a combined cell group;

exchanging in parallel the cell-exiting flux estimates between nodes that have combined cell groups adjacent to one another;

updating in parallel the cell-exiting flux estimates for each combined cell group represented by each node using the cell-exiting flux estimates received from the exchange, wherein each node that participated in the exchange then has data related to the cell-exiting flux estimates of each combined cell group represented in the exchange;

repeating in parallel the exchanging in parallel, updating in parallel, exchanging in parallel, and updating in parallel steps until all nodes have data related to the cell-exiting flux estimates of all cell groups; and repeating the determining, exchanging in parallel, updating in parallel, exchanging in parallel, updating in parallel, and repeating in parallel steps until the cell-exiting flux estimates have reached predetermined conditions.

3. The method of claim 1 wherein the functional relationship is a closed linear one-cell functional relationship.

4. The method of claim 1 wherein the parallel processor multicomputer has a communications diameter of $\log_2(n)$, wherein n is the number of nodes.

5. The method of claim 1 wherein the parallel processor multicomputer has a hypercube architecture.

6. The method of claim 2 wherein one of the predetermined conditions is a Gauss-Seidel convergence rate.

7. The method of claim 1 wherein the step of calculating a cell edge flux, flux functional, and source functional comprises:

calculating a right-moving flux for each cell at each of a plurality of quadrature points;

calculating a flux functional for the right-moving flux in each cell for each basic linear functional of each quadrature point;

calculating a left-moving flux for each cell at each of the plurality of quadrature points;

calculating a flux functional for the left-moving flux in each cell for each basic linear functional of each quadrature point;

calculating a source functional for the right-moving flux in each cell for each quadrature point of each basic linear functional; and calculating a source functional for the left-moving flux in each cell for each quadrature point of each basic linear functional.

8. The method of claim 7 wherein calculating the right-moving flux further comprises:

calculating exiting cell edge flux estimates for each cell group;

calculating the right-moving flux using the local boundary flux estimate of each of the cells;

updating the local boundary flux estimate for each cell group; and calculating the maximum change in the each of the plurality of updated local boundary flux estimates.

9. The method of claim 7 wherein calculating the left-moving flux further comprises:

calculating exiting cell edge flux estimates for each cell group;

calculating the left-moving flux using the local boundary flux estimate of each of the cells;

updating the local boundary flux estimate for each cell group; and calculating the maximum change in the each of the plurality of updated local boundary flux estimates.

10. A system for estimating particle motion in a structure comprising:

a predetermined number of cells spatially modeled into the structure; and a parallel processor multicomputer having a plurality of processors, each processor having an associated node that represents a cell group having local boundary flux estimates, wherein the processors are configured to use a parallel prefix method to update the local boundary flux estimates at each node using the local boundary estimates from every other node, and wherein the processors are further configured to estimate particle motion in the structure.

11. The system of claim 10 wherein the parallel processor multicomputer has a hypercube architecture.

* * * * *